H. E. F. R. BLOCK.
VEHICLE BRAKE.
APPLICATION FILED FEB. 27, 1911.

1,013,473.

Patented Jan. 2, 1912.

WITNESSES:
John C. Sanders
John A. Percival

INVENTOR
Harald Edward Fredrik Rude Block
BY
ATTY

UNITED STATES PATENT OFFICE.

HARALD EDUARD FREDERIK RUDE BLOCK, OF COPENHAGEN, DENMARK.

VEHICLE-BRAKE.

1,013,473. Specification of Letters Patent. Patented Jan. 2, 1912.

Application filed February 27, 1911. Serial No. 611,276.

*To all whom it may concern:*

Be it known that I, HARALD EDUARD FREDERIK RUDE BLOCK, captain, a subject of the King of Denmark, residing at Copenhagen, in the Kingdom of Denmark, have invented new and useful Improvements in Vehicle-Brakes, of which the following is a specification.

The object of the present invention relates to a brake for motor-cars and like conveyances to be used in cases of emergency and is thus arranged, that it can be operated by any one sitting in the tonneau (in motor-cars with seats for two only, from the passengers' seats) so that a passenger can stop the motor and operate the brakes, should the chauffeur for one reason or other be unable to put on the brakes or neglect to do so.

A form of execution of the invention is shown in the accompanying drawing, in which—

Figure 1:
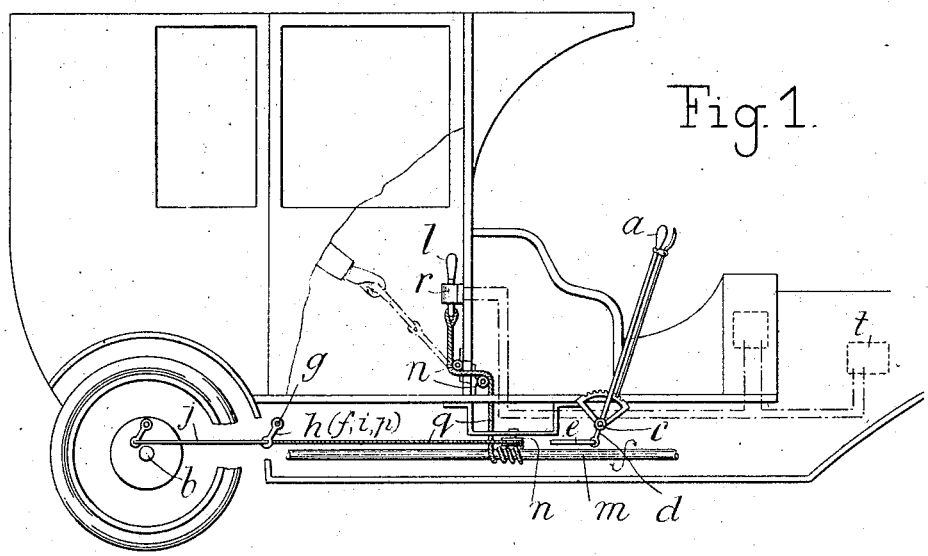
Figure 2:
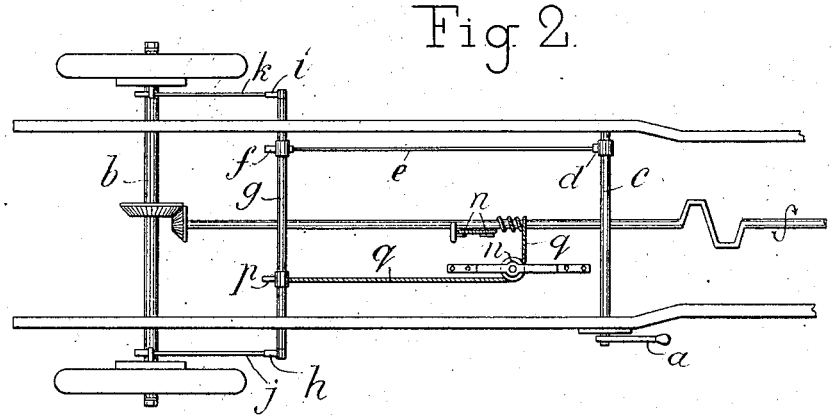
Figure 3:
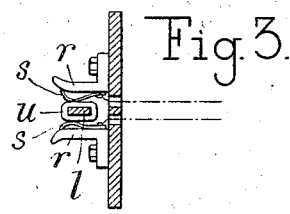

Figure 1 shows a skeleton-like view of the emergency brake-apparatus placed on a motor-car, seen from the side, Fig. 2 shows same from above, and Fig. 3 shows the brake handle in a normal position.

$a$ is the lever, by means of which the chauffeur operates the brakes placed on the axle $b$ of the hind-wheels or on the axle of the fore-wheels.

A common form for a brake-construction on motor-cars or like conveyances is e. g. the following: The lever $a$ is placed on an axle $c$, which carries a short arm $d$, on which is secured a drawing-rod, a rope or the like, referred to as $e$, which is again connected with a short arm $f$, affixed to the axle $g$, that has bearings in the substructure of the motor-car. At the ends of the axle $g$, there are short arms $h$, $i$, to which there is secured a cable, drawing-rods $j$, $k$, or the like, that are connected with the brakes.

The emergency brake-apparatus of the present invention consists of a wire rope $q$, that is affixed to a handle $l$ in the tonneau (or near the passengers' seats) and is carried from this with a round-turn around the motor's driving shaft $m$, over suitable guide pulleys $n$ to an arm $p$ on the brake axle, which arm corresponds to the arm $f$. Ordinarily the handle $l$ is seated in a fork $r$ (see Fig. 3), in which latter there are placed two contact-springs or like contacts $s$, by means of which the current to the motor's igniter $t$ is either closed or broken (according to the manner in which the igniter is constructed) when the handle $l$ with the contact ring or any other suitable contact device is carried into the fork.

The principle of the invention is to prevent the current of ignition from passing through the ignition tubes on the motor by removing the handle from the fork or by the breaking off of the electric contact by the pull following the removal of the handle.

When the emergency brake-apparatus is to be employed, the handle $l$ is pulled out of the fork $r$, whereby the current from the igniter is broken off; by continuing to pull the handle the rope $q$ is tightened around the driving-shaft $m$, and on account of the friction it is wound up on the axle in the direction of its rotation, so that the portion of the rope fastened to the arm $p$ is thereby made shorter, whereby the arm is pulled forward in the same manner, as is the case with the arm $f$, when the chauffeur carries the brake lever $a$ back. If desired, the principle may be employed in the brake on the driving shaft instead of in the wheel-brakes or together with them.

The handle $l$ and the fork for same must be affixed to such a place, that the passenger, when he is to operate the brake, involuntarily first pulls the handle out of the fork and then gives the pull on the rope necessary for operating the brake.

As is evident, the chauffeur can operate his brake-lever $a$ quite independent of the emergency brake-apparatus.

The form of execution shown in the drawing is only shown as an example, as the characteristic feature of the invention is the arrangement of one or other suitable organ placed in the motor's tonneau and affixed to such a place that it is conveniently manipulated by the passengers; in its position of rest this organ must close (or break as the case may be) the current of ignition to the motor, while when the organ is pulled away from its normal position—whereby the motor is stopped—it simultaneously applies the brakes by means of any suitable intermediate link.

Having now described my invention, what I claim as new and desire to secure by Letters Patent is:

1. In a motor-car in combination, a wheel-brake, means for operating same from the chauffeur's seat only, a releasable handle placed in the tonneau, a wire affixed to the said handle, with a round turn wound around the driving-shaft of the motor and thereupon connected with the wheel-brake, guide-pulleys for the said wire and means for breaking of the ignition of the motor, said latter means to be manipulated from the passengers' seats.

2. In a motor-car in combination, a wheel-brake, means for operating same from the chauffeur's seat only, a releasable handle placed in the tonneau and provided with an electric conducting contact-ring, said handle in its position of rest resting with the contact-ring between contact-springs, said contact-springs being each in connection with its part of the motor's current of ignition, a wire affixed to the said handle with a round turn wound around the driving-shaft of the motor and thereupon connected with the wheel-brake, and guide pulleys for the said wire.

In testimony whereof I have signed my name to this specification in the presence of two subscribing witnesses.

HARALD EDUARD FREDERIK RUDE BLOCK.

Witnesses:
D. MASHEN,
F. E. MADREN.